United States Patent [19]

Heermans

[11] 4,134,358
[45] Jan. 16, 1979

[54] AUDIBLE SIGNAL VALVE KNOB

[75] Inventor: Thomas W. Heermans, West Bend, Wis.

[73] Assignee: Regal Ware, Inc., Kewaskum, Wis.

[21] Appl. No.: 859,368

[22] Filed: Dec. 12, 1977

[51] Int. Cl.² .............................................. G01L 19/12
[52] U.S. Cl. .................................. 116/70; 116/137 R
[58] Field of Search ...................... 116/137 R, 70, 117; 126/388; 137/557

[56] References Cited

U.S. PATENT DOCUMENTS

| 700,864 | 5/1902 | Weinberg | 116/137 R |
| 716,568 | 12/1902 | Moore | 116/70 |
| 777,538 | 12/1904 | Puckett | 116/70 |
| 875,310 | 12/1907 | Ayer | 126/388 |
| 957,663 | 5/1910 | Emslie | 116/137 R |
| 999,567 | 8/1911 | Kallstrom | 116/70 |
| 3,459,218 | 8/1969 | Cranage | 116/137 R |

Primary Examiner—S. Clement Swisher
Assistant Examiner—Denis E. Corr
Attorney, Agent, or Firm—Wheeler, Morsell, House & Fuller

[57] ABSTRACT

A knob for a cooking vessel is a whistle which gives an audible signal that cooking temperature has been reached, and has a valve slide for shutting off the whistle. Supporting inside and outside knob parts incorporate halves of a resonance chamber, which makes the knob extremely simple to mold, assemble, clean, and disassemble. The valve slide rests in guides which make it impossible to assemble incorrectly, and overlaid by a knob cover.

14 Claims, 3 Drawing Figures

AUDIBLE SIGNAL VALVE KNOB

BACKGROUND OF THE INVENTION

"Waterless" cooking is old, as are knobs which give an audible signal when steam is formed to indicate attainment of cooking temperatures. For instance U.S. Pat. No. 999,567; 957,663; and 875,310 all show tops for cooking vessels which are provided with whistles and the first two have provision to turn the whistle off, in the case of U.S. Pat. No. 957,663 also stopping the escape of steam. However, mechanically these are quite different from my device. The only one which can be disassembled for cleaning could also release the knob portion accidentally under steam pressure, which might well cause loss of the knob or even injury. The remainder of these patents and U.S. Pat. No. 700,864 cannot be disassembled for cleaning.

None of these structures involve a slide valve. Slide valves are of course known in other connections but a slide valve possesses unique advantages in a whistle knob not apparent from the known prior patents. Likewise, the method of assembly is believed to possess unique advantages.

SUMMARY OF THE INVENTION

A knob for the top or lid of a cooking vessel is provided with a whistle, a resonance chamber, and a slide valve. The knob has four major parts, a base portion which preferably has a non-circular part which projects through a complementary opening in the lid and which carries a whistle orifice and a portion of a resonance chamber; an upper body portion which screws on to the base portion outside the vessel lid and which carries lid engaging parts, asymmetric slide valve guides and stops, and the upper portion of the resonance chamber; the slide valve member itself, which is so shaped as to incorporate spring members and asymmetric abutments for the guides and stops on the upper body; and a valve knob cover portion preferably non-rotatably fastened to the upper body to enclose the valve slide and to provide a surface for a decorative design or wording and to provide a means to separate the knob at the resonance chamber. Each of the parts contains an opening through which steam and sound may escape, the opening in the valve slide being movable from a position aligned with the other openings to a position displaced from the other openings. Because of the preferred screw assembly of the knob base to the remainder of the knob the parts may be readily detached by the user from the vessel top for cleaning and the portions needing to be cleaned are readily accessible. If necessary, the removal of two screws allows complete disassembly of the remainder of the knob for more thorough cleaning. The parts are so shaped that incorrect assembly is impossible and correct assembly is readily determined by inspecting the parts because the shapes of the parts dictate correct assembly. At the same time the slide is so made that when it is assembled it is capable only of limited movement so that it cannot be lost. The knob is sufficiently large so that it may readily be grasped without contact with steam emerging from the central opening. When the contents of a vessel have reached cooking temperature, as indicated by whistling, the slide valve is closed and the temperature reduced for "waterless" cooking at reduced temperatures and pressures. Not all of these features need be present in my invention, but preferably they are. The slide valve keeps the user's fingers away from the steam.

DRAWINGS

DESCRIPTION

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

Figure 1:
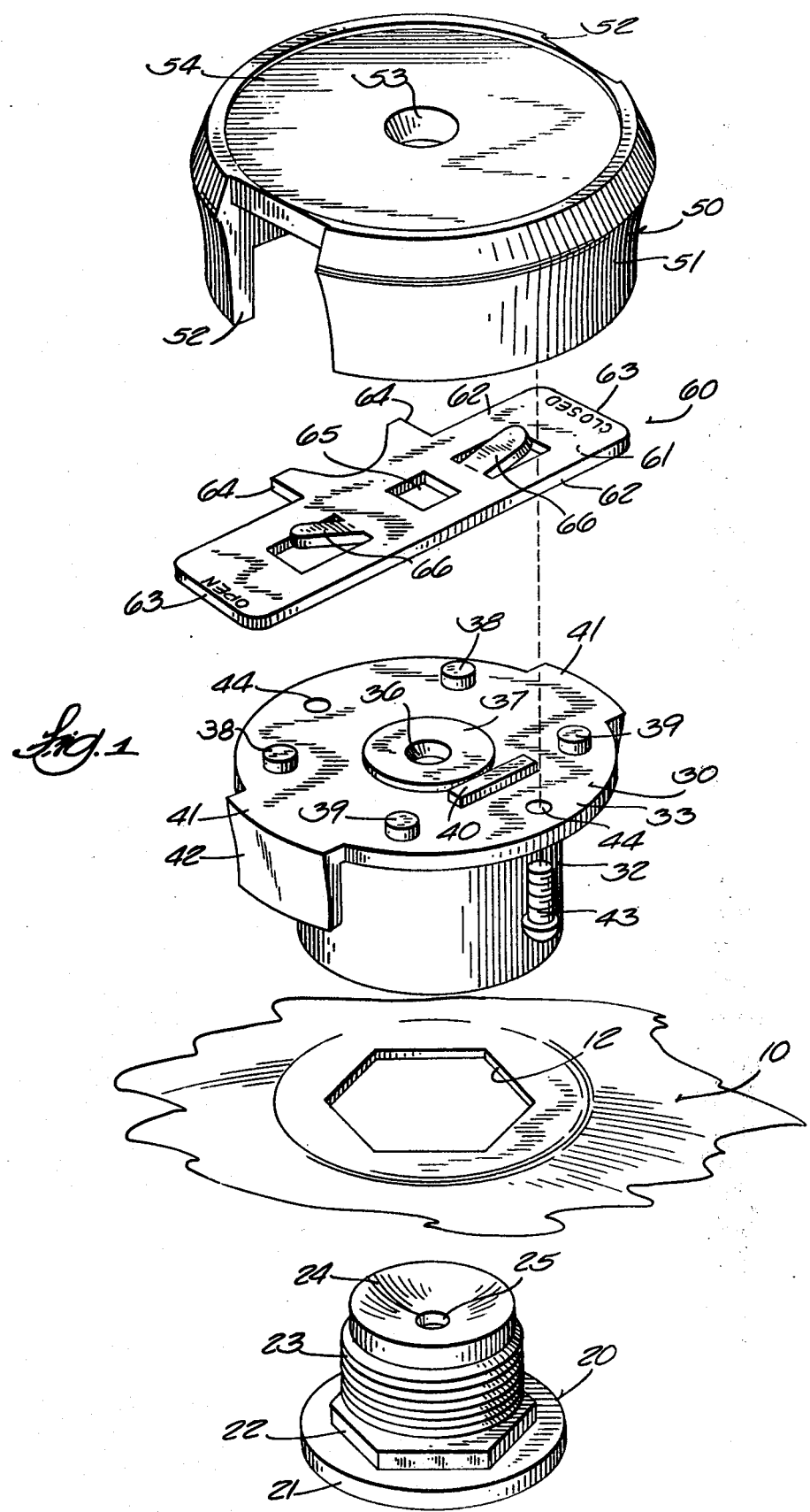
FIG. 1 is an exploded perspective view of the parts of my audible signal valve knob.

As best shown in FIG. 1, the top of a cooking vessel 10 is provided with a non-circular opening 12 to which the various parts of the knob of my invention are mounted. These consist of an inner knob or knob base 20, an outer knob 30, a knob cover 50, and a valve slide 60.

The base or inner knob 20 consists of a lower flange 21, a hexagonal portion 22 to complementarily fit the opening 12 in the vessel 10, which could be any appropriate preferably non-circular shape, a threaded portion 23 and the lower resonance chamber portion 24 surrounding a whistle orifice 25 having a form suited to generate a tone when vapor passes through it. Orifice 25 is better shown in FIG. 2.

Upper knob 30 consists of an inner skirt 31 adapted to screw on to threaded portion 23 of the lower knob, an outer skirt 32 which bears on the vessel 10 when upper knob portion 30 is screwed into place, a horizontal valve supporting surface 33, resonance chamber sidewall 34 and top 35, the center of the top 35 of the resonance chamber being provided with a second whistle orifice 36 directly above the first orifice 25 in the assembled position, an orifice-surrounding boss 37, slide stops 38 and slide guides 39 and guide bar 40 (abutments). At diametrically opposite portions of circular surface 33 the upper knob 30 is provided with slight projections 41, each provided with a depending tab 42 which underlies the slide valve path and becomes a part of the knob cover, which aligns it for non-rotatable assembly by means of screws 43. The knob cover 50 is provided with a depending skirt 51 extending entirely around the knob and enclosing it with the exception of relieved portions 52 the size of depending tabs 42 of the upper knob so that when the knob cover is placed onto the upper knob body it is automatically aligned to receive screws 43 which secure the upper knob body to the knob cover through holes 44. Knob cover 50 is also provided with an orifice 53 at the center of the upper surface and aligned with orifices 25 and 36. Openings 52 in skirt 51, in addition to forming keys to receive tabs 42 for non-rotatable alignment also serve in their upper portions as part of the valve slide path. Ends of the valve slide 60 project therefrom so that they may be manipulated, as will be described later.

Valve slide 60 rests on boss 37 and is movable along a valve slide path extending from one surface sxtension 41 to the diametrically opposite surface extension 41 between stops 38 and guides 39 and 40, along a chord of the knob.

Valve slide 60 consists of a flat rectangular body 61 having a pair of long sides 62 and a pair of short sides 63. One of the long sides 62 is provided with a pair of sidewardly extending abutments 64 which are spaced apart a distance along the slide valve path which is sufficiently less than the distance between stops 38 in the same direction to permit whistle orifice 65 to be moved in the direction of the valve slide path to a first position over orifice 36 and to a second position completely unaligned with orifice 36. For that purpose it is preferable that orifice 65 not be in exact center of rectangular body 61 but be spaced slightly from the center in the direction parallel to long sides 62 and to the valve slide path. Valve slide 60 is also provided with a pair of biasing means which may preferably be integral leaf springs 66. Slide 60 may desirably be formed of a somewhat resilient plastic in which case spring leaves 66 may preferably be molded as an integral part of the valve slide, but extending upwardly out of the plane of the slide 60 to bear against the inside of knob cover 50 and maintain a firm engagement between slide body 61 and boss 37 of upper knob 30.

Figure 2:
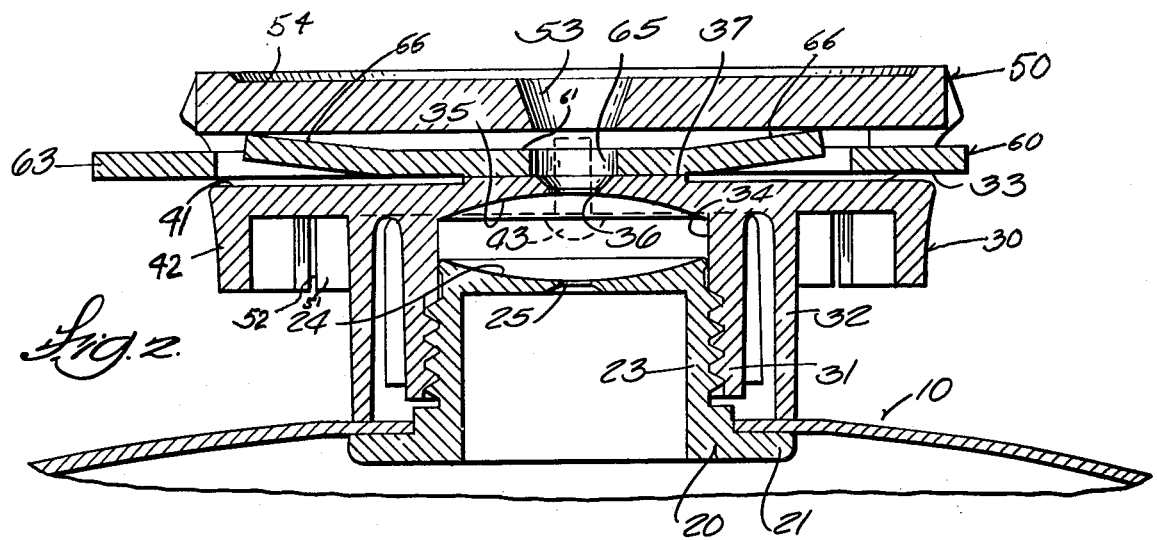
FIG. 2 is a cross sectional view of my knob and of a vessel top in which it is installed in a vertical plane on the diameter.
Figure 3:
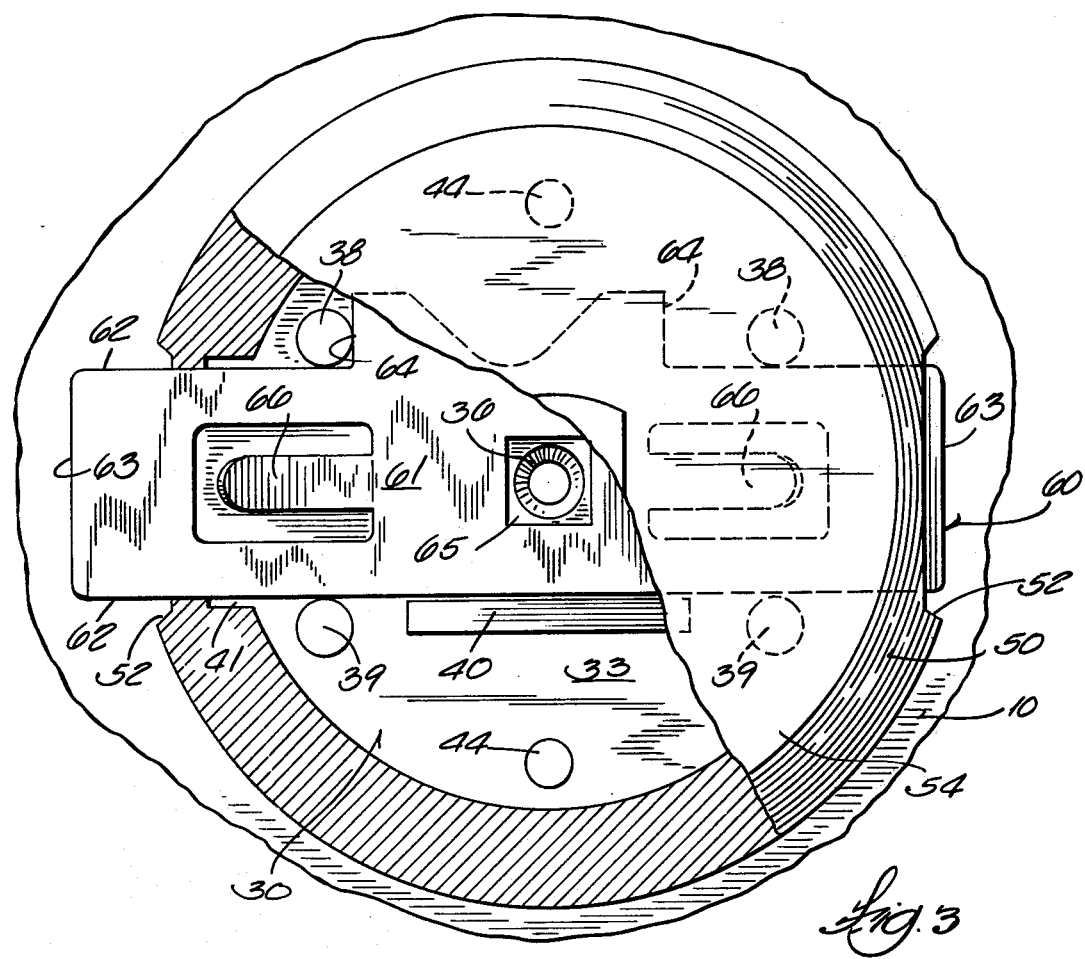
FIG. 3 is a top view of my knob with parts broken away.

When my knob is assembled as shown in FIGS. 2 and 3, one of the ends 63 of valve slide body 61 will project through one of the openings 52 in knob cover 50 and will bear a legend indicating whether the valve is open or closed. It may be slid along the valve slide path by finger pressure on the exposed end 63 to push that end flush with opening 52 and expose the other end 53, thereby operating the valve from open to closed position and vice versa. By reason of the leaf spring portions 66 holding valve slide 60 in close contact with boss 37, the valve slide is always biased into good contact with the boss and provides an effective seal, whether the valve is open or closed. The bias is not so great as to distort valve slide 60, which would tend to degrade the seal rather than enhance it. The exact amount of bias required depends on the material used but is readily adjusted by changes in the angle of the spring leaves 66, or their width, length or thickness. It should be noted that the height of boss 37 above surface 33 is exaggerated here for clarity. The valve construction described is simply made, readily cleaned and re-assembled, and keeps the fingers of the user away from escaping steam, unlike earlier structures.

As a whistle, the knob presents a series of orifices 25, 36, 65, and 53 separated by a resonance chamber consisting of a lower surface 24 in the knob base 20, and upper sides 34 and an upper surface 35 in the upper knob 30, which form a very effective whistle. The remaining two orifices are not a part of the whistle, as such, but provide a valve and an escape path respectively. When food is being heated in vessel 10, a temperature is reached at which substantial quantities of water vapor are generated and rush through orifices 25 and 36 and the intervening resonance chamber, creating a whistling sound to warn the cook that the temperature should now be reduced for effective waterless cooking. The valve slide 60 is then moved from the open position shown in FIG. 2 to its closed position in which opening 65 is displaced with respect to opening 36, by pushing on the projecting end 63 of the valve slide which is at the left in FIGS. 2 and 3 until the other abutment 64 strikes stop 38. The top of vessel 10 in which the knob is located is now completely sealed and will retain the vapor within the pan to seal in the flavors and moisture. Such cooking is well known.

However, the presence of the whistle orifices and resonance chamber in my knob offer the possibility of contamination by volatile food substances, or even, if the conditions are wrong, by solids passing through orifice 25. In any case, it is desirable to be able to attain complete cleanliness in the knob. As best shown in FIG. 1, by removing the entire upper knob body 30, slide 60, and knob cover 50, by unscrewing them from lower knob body 20, the knob may be removed from vessel 10. It will be noted that although pressure can be applied only to knob cover 50, the reliefs 52 serve to prevent relative rotation, as do screws 43, and apply the pressure to tabs 42 of the upper knob body, carrying it along as the cover 50 is rotated. Because opening 12 is preferably non-circular; and complementary non-circular portion 22 of the lower knob body fits within it, it is easy to turn the upper portion while the lower portion remains stationary. The only remaining step to completely disassemble the knob, if that is necessary, is to remove the two screws 43. These have been exposed once the outer parts of the knob are removed, but are concealed by insulative plastic when the knob is assembled.

From a consideration of FIGS. 1 and 3 it will be seen that there is only a single way in which the valve slide 60 may be placed on the upper knob body 30. Stops 38 have a space between them to receive abutments 64 but because of bar 40 there is no comparable space between lugs 39. If the slide 60 is inverted, leaf springs 66 prevent it from resting properly between lugs 38, 39, and 40. When the slide 60 is in place on upper body 30 cover 50 is placed over it, being guided by tabs 42 and reliefs 52 into position so that screws 43 are prefectly aligned for insertion. With screws 43 in place the entire outer part of the knob is unitary. The lower part 20 of the knob may then be inserted in vessel 10 through opening 12 and the outer knob parts screwed on to threads 23, whereupon skirt 32 bears on vessel 10 above flange 21 to give a very secure anchorage.

It will be seen from FIG. 1 that while the parts are disassembled all surfaces are readily accessible for cleaning, whether the disassembly is complete or whether the upper separable parts are merely unscrewed from the base part. In either case there is only one way to re-assemble the parts and that way is clear to the user.

I claim:

1. In a knob for a vessel in which substances containing water are to be heated, said knob containing passages shaped to cause an audible whistle upon the passage of steam through said passages, and having a valve controlling them movement of steam through said passages, the novelty comprising;
   a resonance chamber which is a part of said passages, said knob comprising a base part and a separable part each containing portions of the wall of the resonance chamber whereby separation of the parts permits cleaning of the resonance chamber, the base portion having at least a part underlying the top of said vessel and a non-circular part extending through a complementary non-circular opening in the vessel, said separable part of the knob being removably secured to the base part and having a portion bearing on the outside of the top of the vessel.

2. In a knob for a vessel in which substances containing water are to be heated, said knob containing passages shaped to cause an audible whistle upon the passage of steam through said passages, and having a valve controlling the movement of steam through said passages, the novelty comprising;

a reasonance chamber which is a part of said passages, said knob comprising a base part and a separable part each containing portions of the wall of the resonance chamber whereby separation of the parts permits cleaning of the resonance chamber, the valve comprising an asymmetric valve member having an orifice therein movable in a horizontal path to at least two positions respecting the separable part of the knob, including a first position in which the orifice is aligned with said passages and a second position in which the orifice is not so aligned, and abutment means on said separable knob part disposed asymmetrically in a horizontal plane and defining a path between said first and second positions for said valve member, said abutment means being so positioned with respect to the asymmetric valve member that the valve member fits in the valve path in only one correct manner.

3. In a knob for a vessel in which substances containing water are to be heated, said knob containing passages shaped to cause an audible whistle upon the passage of steam through said passages, and having a valve controlling the movement of steam through said passages, the novelty comprising;

a resonance chamber which is a part of said passages, said knob comprising a base part and a separable part each containing portions of the wall of the resonance chamber whereby separation of the parts permits cleaning of the resonance chamber, the valve comprising an asymmetric valve member having an orifice therein movable to at least two positions respecting the separable part of the knob, including a first position in which the orifice is aligned with said passages and a second position in which the orifice is not so aligned, and asymmetric abutment means on said separable knob part defining a path between said first and second positions for said valve member, said abutment being so positioned with respect to the asymmetric valve member that the valve member fits in the valve path in only one correct manner, the separable knob portion including a knob cover having an orifice aligned with said passages, said knob cover extending over said valve path to secure said valve member therein, said knob cover being provided with an opening at the path for said valve member to permit manual actuation of the valve member through the knob cover, the remainder of the separable portion of said knob having at least one projection extending through said opening beneath said valve member shaped to make said knob cover non-rotatable with respect to the remainder of the separable portion of said knob and to align the knob cover so that its orifice lies over said passages.

4. The device of claim 3 in which fastening means secure said knob cover to the remainder of the separable part of the knob body, said valve member being provided with integral upwardly extending biasing means which are pressed against said knob cover when the parts are assembled, said biasing means being so shaped as to prevent assembly of the valve member to the separable knob portion upside down.

5. In a knob for a vessel in which substances containing water are to be heated, said knob containing passages shaped to cause an audible whistle upon the passage of steam through said passages, and having a valve controlling the movement of steam through said passages, the novelty comprising;

a resonance chamber which is a part of said passages, said knob comprising a base part and a separable part each containing portions of the wall of the resonance chamber whereby separation of the parts permits cleaning of the resonance chamber, the valve comprising an asymmetric valve member having an orifice therein movable to at least two positions respecting the separable part of the knob, including a first position in which the orifice is aligned with said passages and a second position in which the orifice is not so aligned, and asymmetric abutment means on said separable knob part defining a path between said first and second positions for said valve member, said abutment being so positioned with respect to the asymmetric valve member that the valve member fits in the valve path in only one correct manner, the valve member being generally rectangular with a central laterally extending projection lying between valve path defining abutments spaced apart a distance at least equal to the distance across the projection plus the distance across the whistle passages at the point where they are crossed by the valve member, said knob being circular and said valve path being a chord of the separable portion of the knob.

6. In a knob for a cooking vessel top, a base projecting through the vessel and provided with a first whistle orifice and a surrounding lower resonance chamber wall, an upper body abutting the vessel top removably secured to the base above the vessel top comprising an upper resonance chamber wall and a having a second orifice therein, a path area defined by abutments on the top of the upper body in which a slide valve member slides, said path crossing the opening in the upper resonance chamber; a slide valve member in said channel having a side projection, said abutments being positioned to limit the travel of said side projection, said slide valve member having first and second positions in the channel defined by said abutments and being provided with a third orifice aligned with the opening in the upper member of the resonance chamber in said first position and non-aligned therewith in said second position, and a knob cover with a fourth orifice aligned with the intersection between the resonance chamber and the valve slide channel and removably secured to the upper body portion.

7. The device of claim 6 in which the valve slide is made of resilient plastic and is provided with a flat central portion containing the orifice, said path comprising a channel defined by the abutments, and integral biasing means on said valve slide extending into contact with said knob cover when the valve cover is in place the upper body portion to bear on the biasing means and urge the valve slide member downwardly into good contact with the margins of the opening in the upper knob body from the resonance chamber.

8. The device of claim 7 in which the biasing means urging the slide valve member toward face engagement with the circular boss comprises a pair of leaf spring tabs integral with the material of the valve slide but extending upwardly therefrom a distance greater than the depth of the slide channel to engage the valve knob cover and maintain the slide in engagement with the area of the boss surrounding the port.

9. The device of claim 6 in which the valve slide side projection is at only one side of the valve slide, and the said abutments include a ridge at only the other side of the valve path, so that the valve slide may only be assembled to the upper body in a correct orientation.

10. The device of claim 6 in which the length of the valve slide member is greater than the length of the valve slide path on the upper body portion by an amount equal to the distance between the said abutments which limit travel of the valve slide side projection minus the distance across the valve slide side projection, whereby when the valve slide is actuated in one direction an amount of the valve slide equivalent to the said excess length of the slide projects from one side of the knob, and when the valve slide is actuated in the other direction an equivalent amount of the valve slide projects from the other side of said knob to provide a visual indication of which end of the valve slide to push to change the condition of the valve.

11. The device of claim 6 in which the first whistle orifice is the primary producer of sound.

12. The device of claim 6 in which the upper body portion is held to the lower body portion by a screw thread, the lower body portion having a non-circular portion to engage a non-circular vessel opening and a flange extending laterally therefrom through which it extends and the upper body portion having a vessel top engaging portion opposed to said flange to clamp the vessel top between the upper body portion and the lower body portion when the screw thread is engaged, the cover portion being screwed to the upper body portion by means of screws extending upwardly through a portion of the upper body and into the cover whereby said screws are concealed, but are accessible when said upper body and cover are unscrewed from sadi lower body portion.

13. The device of claim 6 wherein said valve path is linear and said valve slide is rectangular, said path defining abutments being a raised bar integral with the upper body and parallel to a long side of the slide valve member, and at least two projections adjacent the long side of the slide valve opposite said bar and spaced apart a distance equal to the width of the valve slide side projection member plus a distance at least equal to the larger of (1) the orifice in the slide valve member and (2) the orifice from the upper portion of the resonance chamber to the slide valve path.

14. The device of claim 6 in which the slide valve member rests on a cylindrical boss surrounding the orifice from the upper portion of the resonance chamber to the slide channel, said cylindrical boss being of less height than said bar and said stops whereby contact between the bottom of the slide valve and the path on the upper body of the knob is limited to reduce friction, and to improve sealing.

* * * * *